(12) United States Patent
Hong

(10) Patent No.: US 9,413,950 B2
(45) Date of Patent: Aug. 9, 2016

(54) DETERMINING A DEVICE IDENTIFIER FROM A LIGHT SIGNAL EMITTED BY A DEVICE

(71) Applicant: HEWLETT-PACKARD DEVELOPMENT COMPANY, L.P., Fort Collins, CO (US)

(72) Inventor: Wei Hong, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 259 days.

(21) Appl. No.: 13/750,656

(22) Filed: Jan. 25, 2013

(65) Prior Publication Data

US 2014/0211035 A1   Jul. 31, 2014

(51) Int. Cl.
| | |
|---|---|
| H04N 5/225 | (2006.01) |
| H04N 5/232 | (2006.01) |
| H04N 21/4223 | (2011.01) |
| H04N 21/426 | (2011.01) |
| H04N 21/436 | (2011.01) |
| H04N 21/442 | (2011.01) |
| H04N 21/4788 | (2011.01) |

(52) U.S. Cl.
CPC ....... *H04N 5/23229* (2013.01); *H04N 21/4223* (2013.01); *H04N 21/42684* (2013.01); *H04N 21/436* (2013.01); *H04N 21/44227* (2013.01); *H04N 21/4788* (2013.01)

(58) Field of Classification Search
CPC ..... H04N 5/225; H04N 7/183; H04N 5/2353; H04B 10/04; G09G 5/10
USPC ....................................................... 348/222.1
See application file for complete search history.

(56) References Cited

U.S. PATENT DOCUMENTS

| | | | |
|---|---|---|---|
| 8,464,184 B1* | 6/2013 | Cook et al. ..................... 715/863 |
| 2003/0058262 A1* | 3/2003 | Sato et al. ...................... 345/690 |
| 2004/0161246 A1* | 8/2004 | Matsushita et al. ........... 398/187 |
| 2007/0066323 A1* | 3/2007 | Park ......................... G01S 5/02 455/456.2 |
| 2007/0070060 A1* | 3/2007 | Kagawa et al. ................ 345/418 |
| 2008/0297615 A1* | 12/2008 | Kagawa et al. ............. 348/222.1 |
| 2010/0257251 A1* | 10/2010 | Mooring et al. .............. 709/216 |
| 2011/0007160 A1* | 1/2011 | Okumura ...................... 348/143 |
| 2011/0148752 A1* | 6/2011 | Alameh et al. ................ 345/156 |
| 2011/0289147 A1* | 11/2011 | Styles ..................... G06F 3/017 709/205 |
| 2011/0319166 A1* | 12/2011 | Bathiche et al. ................ 463/40 |
| 2012/0272158 A1* | 10/2012 | Weskamp ............. H04W 4/023 715/748 |
| 2013/0222405 A1* | 8/2013 | Ademar ................ G06F 3/1423 345/581 |
| 2013/0335592 A1* | 12/2013 | Yamada et al. ............ 348/229.1 |

OTHER PUBLICATIONS

Butz, A.; "Visualization of and Interaction with Digital Devices Around Large Surfaces as a Function of Proximity" ; Apr. 21, 2011; http://grouplab.cpsc.ucalgary.ca/grouplab/uploads/Publications/Publications/2011-Ballendat.DiploneThesis.pdf.

Lucero, A. et al.; "Pass-them-around: Collaborative Use of Mobile Phones for Photo Sharing" ; May 7-12, 2011; http://research.nokia.com/files/public/lucero11_PassThem.pdf.

(Continued)

*Primary Examiner* — Nicholas Taylor
*Assistant Examiner* — Sanjoy Roy
(74) *Attorney, Agent, or Firm* — HP Inc Patent Department

(57) ABSTRACT

A method performed by a processing system includes determining a device identifier corresponding to a device from a series of captured images that include a light signal emitted by the device.

15 Claims, 7 Drawing Sheets

(56) References Cited

OTHER PUBLICATIONS

Masateru Minami, et al.; DOLPHIN: A Practical Approach for Implementing a Fully Distributed Indoor Ultrasonic Positioning System; N. Davies et al. (Eds.): UbiComp 2004, LNCS 3205, pp. 347-365, 2004. © springer-verlag Berlin Heidelberg 2004.

Mike Hazas, et al.; A Relative Positioning System for Co-located Mobile Devices; USENIX Association; MobiSys '05: The Third International Conference on Mobile Systems, Applications and services.

Nissanka B. Priyantha, et al.; The Cricket Compass for ContextAware Mobile Applications htto://nms.lcs.mit.edu/cricket/ : 7th ACM Conf. Mobile Computing and Networking MOBICOM, Jul. 2001, Rome, Italy.

Xing, B. et al.;"Proximiter: Enabling Mobile Proximity-based Content Sharing on Portable Devices"; Mar. 9-13, 2009; http://www.ics.uci.edu /~projects/dissemination/papers/[2009PerCom]Proximiter.pdf.

* cited by examiner

DETERMINING A DEVICE IDENTIFIER FROM A LIGHT SIGNAL EMITTED BY A DEVICE

BACKGROUND

Users of electronic devices, such as smartphones, tablets, laptops, and other processing systems, often wish to share electronic content with users of other devices. To do so, a user generally enters some form of information that identifies the other users to allow the content to be transmitted to the other users. The information may be an email address, a telephone number, a network address, or a website, for example. The entry of this information, however, may be inconvenient for a user as the user must somehow obtain the information and convey it to the appropriate location in a user interface of the device.

DETAILED DESCRIPTION

In the following detailed description, reference is made to the accompanying drawings, which form a part hereof, and in which is shown by way of illustration specific embodiments in which the disclosed subject matter may be practiced. It is to be understood that other embodiments may be utilized and structural or logical changes may be made without departing from the scope of the present disclosure. The following detailed description, therefore, is not to be taken in a limiting sense, and the scope of the present disclosure is defined by the appended claims.

As described herein, a processing system (e.g., a smartphone, tablet, or laptop) locates and identifies electronic devices that are in a field of view of a camera of the processing system using light signals emitted by the devices. The processing system determines identifiers for the devices from the light signals and communicates these identifiers for a device identification service to facilitate interactions (e.g., content sharing) between the processing system and the other devices.

Using identifiers determined from the light signals of the other devices, the processing system enables functionalities that, when invoked, produce interactions between the processing system end selected devices. The processing system invokes the functionalities responsive to selections from a user received through a user interface, where the selections correspond to one or more devices. The user interface may show visual representations of the positions and orientations of the other devices relative to one another and relative to the processing system. The visual representations may be enhanced using information from the device identification service, e.g., by displaying the names of the users as part of the representations. A user may use the visual representations in providing selections that invoke the functionalities.

Compared to previous device interaction approaches, the examples described herein may allow a user to accurately identify a target device for interaction based on a location and relative position of the device. The user may also visually distinguish the target device from other allocated devices to ensure that any desired interactions are not inadvertently or maliciously misdirected to other devices. As a result, the user may intuitively and securely share desired content based on the locations and relative positions of other devices.

Figure 1:
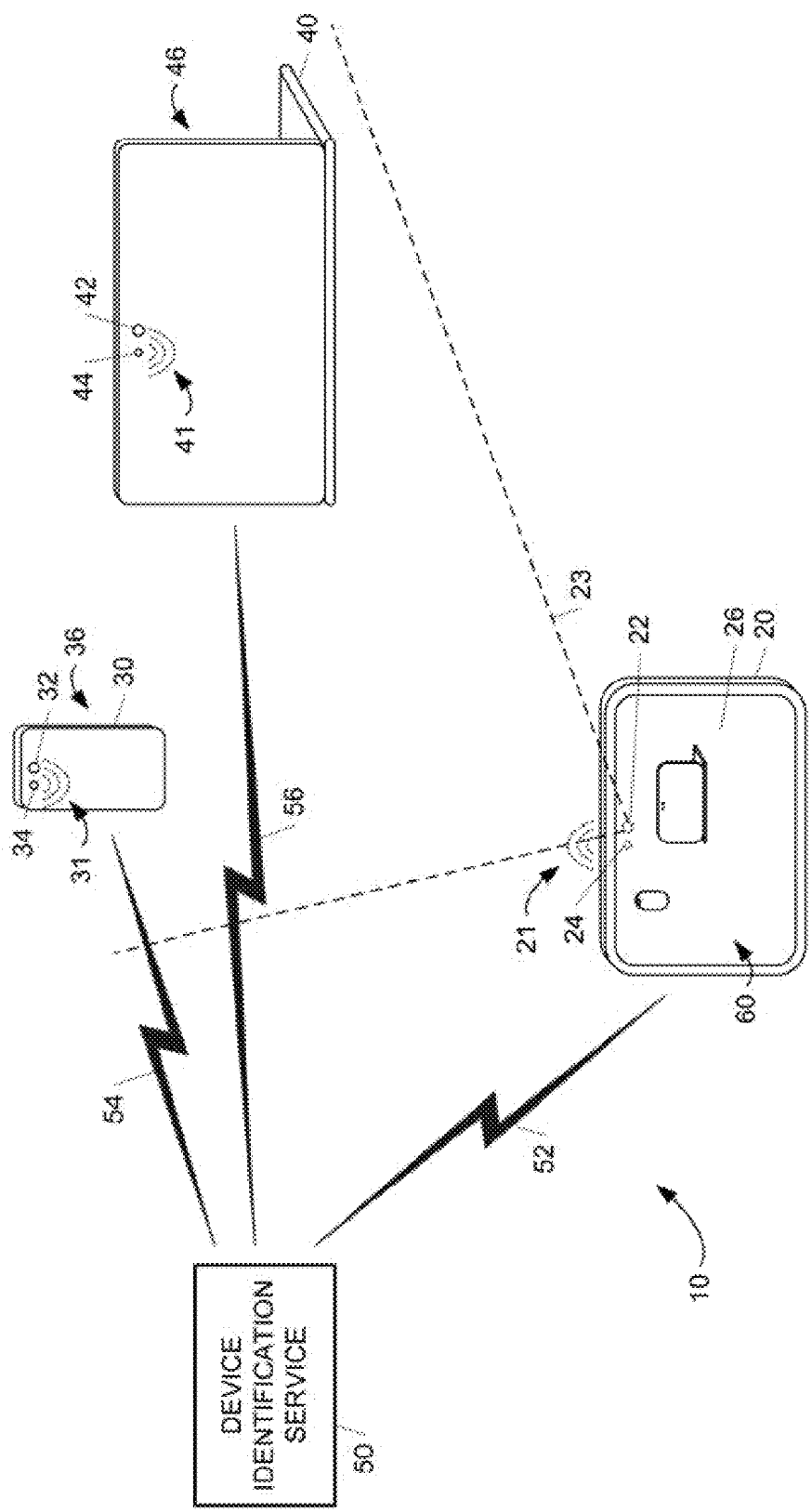
FIG. 1 is a schematic diagram illustrating an example of a processing environment with a processing system that locates and interacts with other devices that emit light signals.

FIG. 1 is a schematic diagram illustrating an example of a processing environment 10 with a processing system 20 that locates and interacts with other devices 30 and 40 that emit light signals 31 and 41, respectively, as wall as any number of other devices emitting light signals as described herein (not shown). Processing system 20 may also emit a light signal 21 in some examples. Processing system 20 and devices 30 and 40 communicate with a device identification service 50 using network connections 52, 54, and 56, respectively, to facilitate the interaction of processing system 20 with devices 30 and 40.

The description herein will primarily describe the operation of environment 10 from the perspective of processing system 20. The functions described with reference to processing system 20 may also be performed by devices 30 and 40 and other suitable devices (not shown) in other examples. As used herein, the terms processing system and device are used interchangeably such that processing system 20 may also be referred to device 20 and devices 30 and 40 may also be referred to as processing systems 30 and 40. In FIG. 1, processing system 20 is shown as a tablet computer, and devices 30 and 40 are shown as a smartphone and a laptop, respectively. The type and arrangement of these devices 20, 30, and 40 as shown in FIG. 1 as one example, and many other types and arrangements of devices may be used in other examples.

Each of processing system 20 and devices 30 and 40 may be implemented using any suitable type of processing system with a set of one or more processors configured to execute computer-readable instructions stored in a memory system where the memory system includes any suitable type, number, and configuration of volatile or non-volatile machine-readable storage media configured to store instructions end data. Examples of machine-readable storage media in the memory system include hard disk drives, random access memory (RAM), read only memory (ROM), flash memory drives and cards, and other suitable types of magnetic and/or optical disks. The machine-readable storage media are considered to be an article of manufacture or part of an article of manufacture. An article of manufacture refers to one or more manufactured components.

Processing system 20 and devices 30 and 40 include emitters 24, 34, and 44, respectively, that emit light signals 21, 31 and 41, respectively, that encode respective device identifiers for the emitting devices. Each device identifier is a unique binary code, and each emitter 24, 34, and 44 modulates the intensity of emitted light to encode the respective device identifiers. Processing system 20 and devices 30 and 40 may be assigned device identifiers as part of a manufacturing process, may receive-device identifiers from device identification service 50, and/or may receive device identifiers from a user using a user interface or other suitable application. Processing system 20 and devises 30 and 40 may encode the respective device identifiers using Manchester or any other suitable encoding scheme. The emitted light may be in the infrared (IR) light spectrum, the near infrared light spectrum, and/or the visible light spectrum.

Emitters 24, 34, and 44 may each include any suitable type, number, and/or combination of IR, near IR, and/or visible light emission devices such as light emitting diodes (LEDs). In one specific example, one or more of emitters 24, 34, end 44 may be included as part of an active depth camera (not shown). Emitters 24, 34, and 44 may emit light signals 21, 31, and 41, respectively, continuously, intermittently, or programmatically (e.g., when the corresponding devices 20, 30, or 40 operate in a discoverable mode).

Processing system 20 and devices 30 and 40 include cameras 22, 32, and 42, respectively, that capture respective series of images (e.g., still and/or video images) that include one or more of the light signals 21, 31, and 41 emitted by other devices. As shown in FIG. 1, camera 22 of processing system 20 captures a series of images in a field of view 23 of camera 22 that includes devices 30 and 40. Because devices 30 and 40 are in field of view 23, camera 22 captures the series of images to include light signals 31 and 41 emitted by devices 30 and 40, respectively, where light signals 31 and 41 encode the device identifiers of devices 30 and 40, respectively.

Each camera 22, 32, and 42 represents any suitable type and number of cameras that capture a series of images within a field of view to include at least a portion of the light spectrum of the light signals 21, 31, and/or 41 emitted by other devices 20, 30, and/or 40. Cameras 22, 32, and 42 may each include any suitable image sensor, such as a digital charge couple device (CCD) or complementary metal-oxide-semiconductor (CMOS) active pixel sensor.

Processing system 20 and devices 30 and 40 may also include displays 26, 36, and 46, respectively, that display respective images or series of images captured by cameras 22, 32, and 42, respectively, along with any other suitable content, information, and user interfaces. As shown in FIG. 1, display 26 of processing system 20 displays an image 60 captured by camera 22 while devices 30 and 40 were in field of view 23 of camera 22. Accordingly, a representation of devices 30 and 40 in image 60 displayed by display 26 is visible by a user of processing system 20. Depending on the light spectrum of emitted light signals 31 and 41, light signals 31 and 41 may also be visible in image 60 when displayed by display 26 to a user of processing system 20. Light signals 31 and 41, or representations thereof, may also be adapted, enhanced, or added to image 60 by processing system 20 to be visible by a user of processing system 20.

Device identification service 50 communicates with processing system 20 and devices 30 and 40 using network connections 52, 54, and 56, respectively. Device identification service 50 registers the device identifier for each of processing system 20 and devices 30 and 40 along with information that allows device identification service 50 to communicate with processing system 20 and devices 30 and 40. Device identification service 50 may also store and/or access other information concerning processing system 20 and devices 30 and 40 and/or users of processing system 20 and devices 30 and 40 such as user profiles, device names, device models, and Internet Protocol (IP) addresses of processing system 20 and devices 30 and 40. In some examples, device identification service 50 generates the device identifiers for processing system 20 and devices 30 and 40 as part of the registration process and provides the device identifiers to processing system 20 and devices 30 and 40.

Network connections 52, 54, and 56 include any suitable type, number, and/or configuration of network and/or port devices or connections configured to allow processing system 20 and devices 30 and 40, respectively, to communicate with device identification service 50. The devices and connections of connections 52, 54, and 56 may operate according to any suitable networking and/or port protocols to allow information to be transmitted by processing system 20 and devices 30 and 40 to device identification service 50 and received by processing system 20 and devices 30 and 40 from device identification service 50.

An example of the operation of processing system 20 in enabling functionalities that produce interactions between processing system 20 and devices 30 and 40 will now be described with reference to the method shown in FIG. 2.

Figure 2:
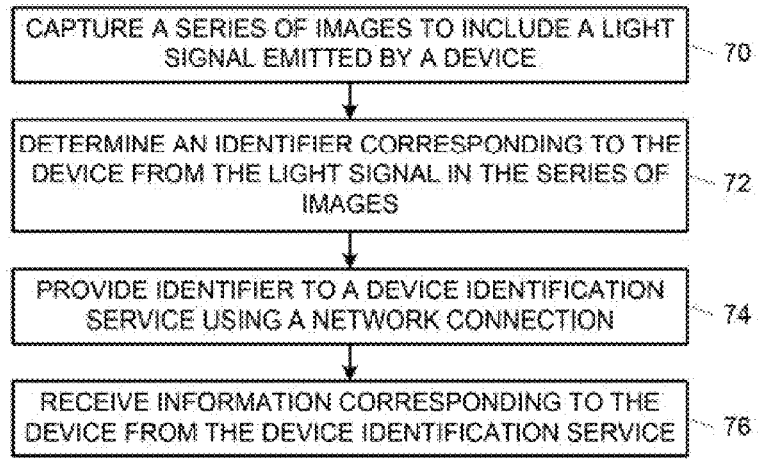
FIG. 2 is a flow chart illustrating an example of a method for enabling a functionality that produces an interaction between a processing system and another device.

In FIG. 2, processing system 20 captures a series of images 60 with camera 22 to include light signal 31 emitted by device 30 and light signal 41 emitted by device 40 as indicated in a block 70. A user of processing system 20 turns on or otherwise activates camera 22 and positions camera 22 so that devices 30 and 40 are in field of view 23 of camera 22 while devices 30 and 40 are emitting light signals 31 and 41, respectively. Accordingly, the series of images 60 captured by camera 22 include light signals 31 and 41.

Processing system 20 determines a device identifier corresponding to device 30 and a devise identifier corresponding to device 40 from light signals 31 and 41, respectively, in images 60 as indicated in a block 72. Processing system 20 processes images 60 in real-time to detect the positions of the emitters 34 and 44 in images 60 and demodulate the intensity of light signals 31 and 41 to decode the device identifiers corresponding to devices 30 and 40.

Figure 3:
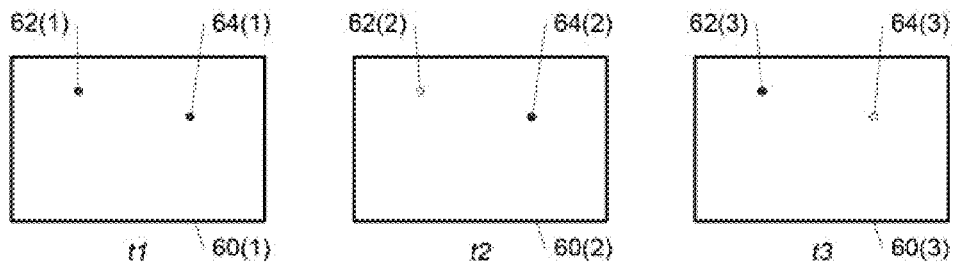
FIG. 3 is a schematic diagram illustrating an example of determining device identifiers from a series of images.

FIG. 3 is a schematic diagram illustrating an example of determining device identifiers from a series of images 60(1)-60(3) captured by camera 22 at times t1-t3, respectively. In images 60(1)-60(3), processing system 20 detests a series of emissions 62(1)-62(3) from device 30 and a series of emissions 64(1)-64(3) from device 40. Emissions 62(1)-62(3) occur in similar positions in images 60(1)-60(3), and emissions 64(1)-64(3) occur in similar positions in images 60(1)-60(3). By examining the light intensity modulation pattern of emissions 62(1)-62(3) across images 60(1)-60(3) as well as any suitable number of other images in the series (not shown), processing system 20 decodes a device identifier corresponding to device 30. Similarly, processing system 20 decodes a device identifier corresponding to device 40 by examining the light intensity modulation pattern of emissions 64(1)-64(3) across images 60(1)-60(3).

Processing system 20 provides the device identifiers to device identification service 50 using network connection 52 as indicated in a block 74. Processing system 20 receives information corresponding to devices 30 and 40 from device identification service 50 as indicated in a block 76. Processing system 20 pairs the received information with the locations of devices 30 and 40 in images 60. The received information may include user profiles or other information that identifies users of devices 30 and 40, device names, device models, and/or Internet Protocol (IP) addresses of devices 30 end 40.

Using the received information, processing system 20 enables functionalities that, when invoked by a user of processing system 20, produces interactions between processing system 20 and devices 30 and 40. The functionalities may include, for example, the ability to send designated content (e.g., files, messages, or other suitable information) from processing system 20 to devices 38 and/or 40. Depending on the information provided by device identification service 50, processing system 20 may perform the functionalities that produce the interactions via device identification service 50 using network connections 52, 54, and/or 56 or directly with devices 30 and/or 40 using any suitable network connection (not shown).

Another example of the operation of processing system 20 in enabling the selection of a functionality that provides designated content from 20 processing system to device 30 or 40 will now be described with reference to the method shown in FIG. 4.

Figure 4:
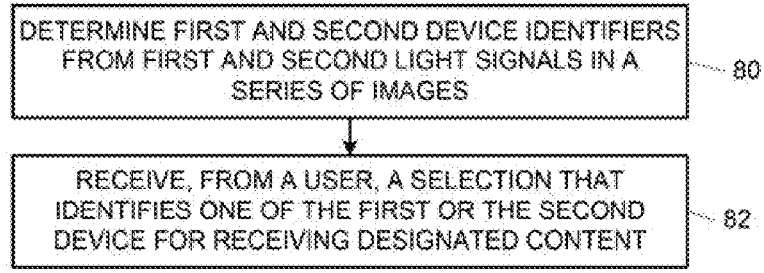
FIG. 4 is a flow chart illustrating an example of a method for enabling the selection of a functionality that provides designated content from a processing system to another device.

In FIG. 4, processing system 20 determines device identifiers corresponding to devices 30 and 40 from light signals 31 and 41, respectively, in images 60 as indicated in a block 80. Processing system 20 may perform this function as described above with reference to FIG. 3 in some examples.

Processing system 20 receives, from a user of processing system 20, a selection that identifies one of device 30 or 40 for receiving designated content stored on or otherwise accessible to processing system 20 as indicated in a block 82. In this example, the user of processing system 20 may recognize or otherwise be notified by processing system 20 that device identifiers corresponding to devices 30 and 40 have been decoded, possibly prior to receiving any information corresponding to devices 30 and/or 40 from device identification service 50. The user may provide a selection in a user interlace of processing system 20 that identifies one of device 30 or 40 along win an indication of designated content that is stored on or otherwise accessible to processing system 20 to cause the designated content to be provided to the selected one of device 30 or 40. The selection may identity one of device 30 or 40 based on the relative positions between processing system 20 and devices 30 and 40 as further illustrated by the examples below.

Processing system 20 provides the designated content to the selected device 30 or 40 using the device identifier of the selected device 30 or 40 to produce an interaction between processing system 20 and device 30 or 40. Processing system 20 may provide the designated content and device identifier to the selected device 30 or 40 via device identification service 50 or directly to the selected device 30 or 40 using information provided by device identification service 50.

As shown in the example of FIG. 1, multiple devices 30 and 40 may be in field of view 23 of camera 22 of processing system 20. Processing system 20 provides a user with the ability to select a target device for interaction (e.g., one of devices 30 or 40) from set of possible devices (e.g., devices 30 and 40) as illustrated in the examples shown in FIGS. 5-8.

Figure 5:
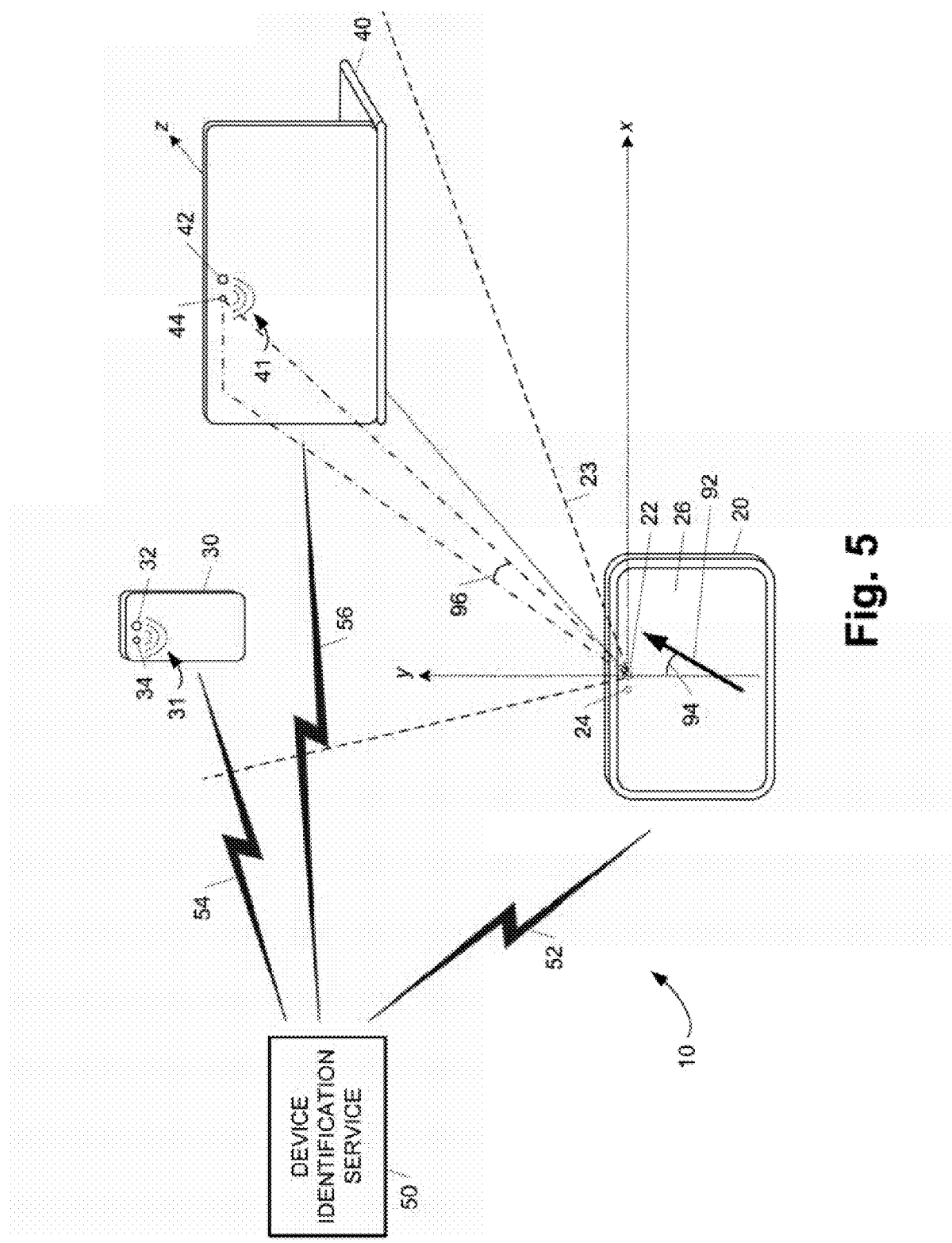
FIG. 5 is a schematic diagram illustrating an example of a processing system receiving a selectors and invoking a functionality based on a direction of the selection.

FIG. 5 is a schematic diagram illustrating an example of processing system 20 receiving a selection and invoking a functionality based on a direction of the selection. In the example of FIG. 5, a user inputs a selection into a user interface of processing system 20 to select a target device based on a direction of the target device relative to processing system 20 that is indicated by the selection. The user may enter the selection by dragging an icon representing designated content in the direction of a target device relative to processing system 20 (e.g., by flicking the icon in the direction using a touchscreen or touchpad or by holding a mouse button and moving the mouse in the direction).

In the example of FIG. 5, an image plane of camera 22 is defined in an x-y plane where a z-axis is orthogonal to the image plane. Processing system 20 determines a selection angle of a selection from a user as the angle between the direction indicated by the selection and a center line of processing system 20 termed by the y-axis. Processing system 20 also determines device angles of devices 30 and 40 relative to processing system 20 using images 60. A device angle may be defined as the angle between a device inside the field of view of camera 22 and the y-z plane (i.e., the center piano of processing system 20) and may be computed using Equation I where x is the horizontal coordinate of emitter 44 with respect to the center of the image plane of camera 22, y is the vertical coordinate of emitter 44 with respect to the center of the image plane of camera 22, and f is the focal length of camera 11.

$$\text{device angle} = \arctan(x/(y^2+f^2)^{1/2}) \quad \text{Equation I}$$

Processing system 20 determines a target device as the device with a device angle closest to a selection angle. If multiple devices have similar device angles, processing system 20 may provide a list or other representation of these devices to the user to allow the user to confirm which device has been selected.

In the example of FIG. 5, the user inputs a selection in a direction indicated by an arrow 92 where the selection corresponds to designated content. Processing system 20 determines a selection angle 94 of the selection as the angle between the direction indicated by arrow 92 and a center line of processing system 20 formed by the y-axis. Processing system 20 also determines a device angle 96 of device 40 relative to processing system 20 using images 60. Because processing system 20 determines that selection angle 94 is closest to device angle 96, processing system 20 determines device 40 to be the target device. Accordingly, processing system 20 invokes a functionality corresponding to device 40 based on the selection, the direction of the selection, and the designated content (e.g., by sending the designated content to device 40).

Figure 6:
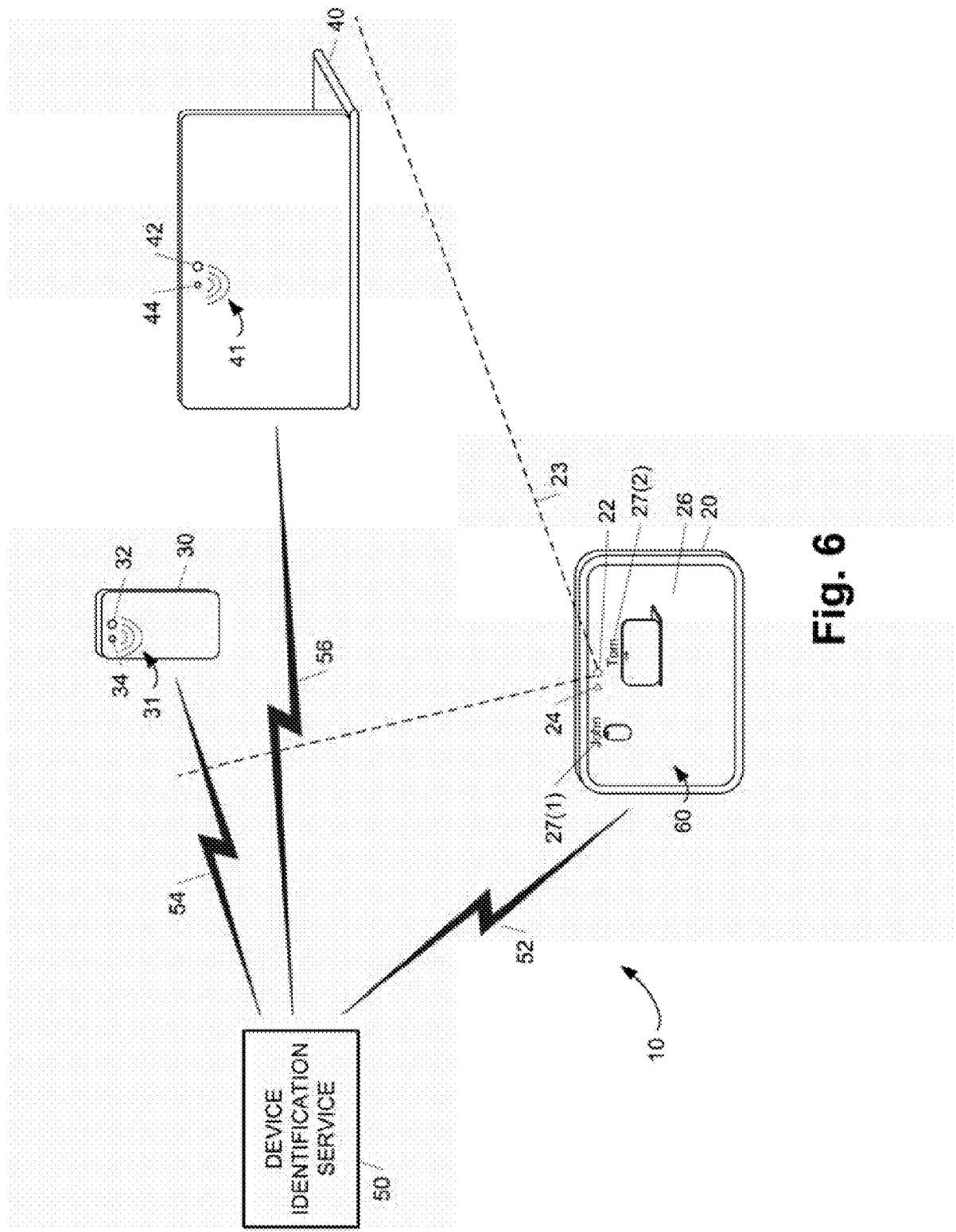
FIG. 6 is a schematic diagram illustrating an example of a processing system displaying a user interface with information received from a device interaction service to enable functionalities.

FIG. 6 is a schematic diagram illustrating an example of processing system 20 displaying a user interface with information received from device interaction service 60 to enable functionalities. In the example of FIG. 6, processing system 20 displays a representation 27(1) of device 30 that includes the image of device 30 in image 60 and information from device identification service 50 that identifies the user of device 30 as John. Similarly, processing system 20 displays a representation 27(2) of device 40 that includes the image of device 40 in image 60 and information from device identification service 50 that identifies the user of device 40 as Tom. Processing system 20 allows a user to select a target device by selecting any suitable portion of representation 27(1) or 27(2) to select device 30 or 40 (e.g., by dragging designated content on top of representation 27(1) or 27(2) using a touchscreen or mouse). In response to a target device being selected, processing system 20 invokes a functionality corresponding to the device (e.g., by sending designated content to the target device).

Figure 7:
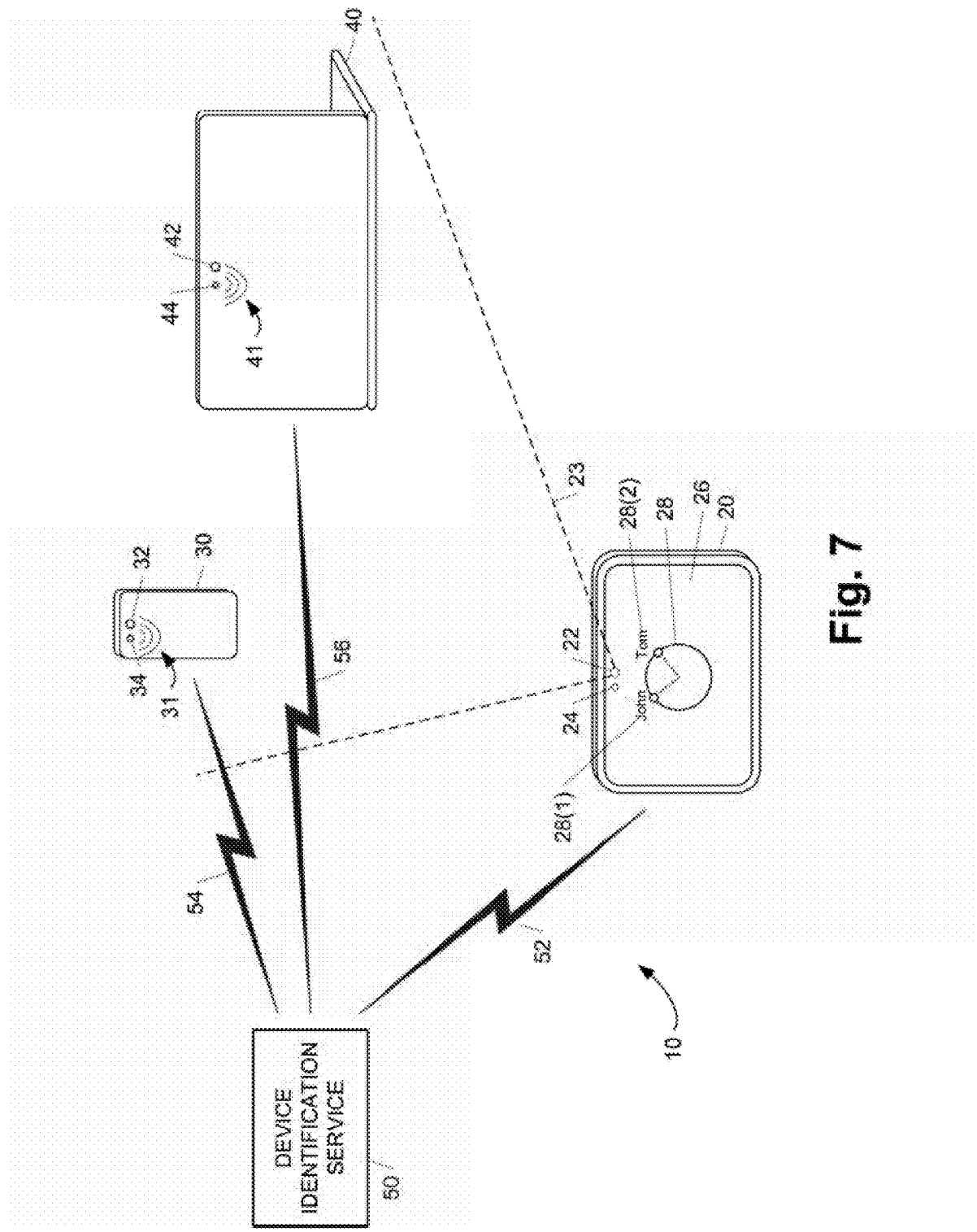
FIG. 7 is a schematic diagram illustrating an example of a processing system displaying a user interface to enable functionalities based on angles between devices.

FIG. 7 is a schematic diagram illustrating an example of processing system 20 displaying a user interface to enable functionalities based on angles between devices 20 and 30 and 20 and 40. In the example of FIG. 7, processing system 20 displays a circular map 28 with a representation for each device within field of view 23. Processing system 20 selects the location for each representation on circular map 28 in dependence upon a corresponding device angle (e.g., the angle between the device and an plane orthogonal to image plane of camera 22). In the illustrated example, circular map 28 includes a representation 28(1) of device 30 that includes information from device identification service 50 that identifies the user of device 30 as John and a representation 28(2) of device 40 that includes information from device identification service 50 that identifies the user of device 40 as Tom. The locations of representations 28(1) and 28(2) in circular map 28 are selected by processing system 20 in dependence on the device angles of devices 30 and 40, respectively. Processing system 20 allows a user to select a target device by selecting any suitable portion of representation 28(1) or 28(2) to select device 30 or 40 (e.g., by dragging designated content on top of representation 28(1) or 28(2) using a touchscreen or mouse). In response to a target device being selected, processing system 20 invokes a functionality corresponding to the device (e.g., by sending designated content to the target device).

Figure 8:
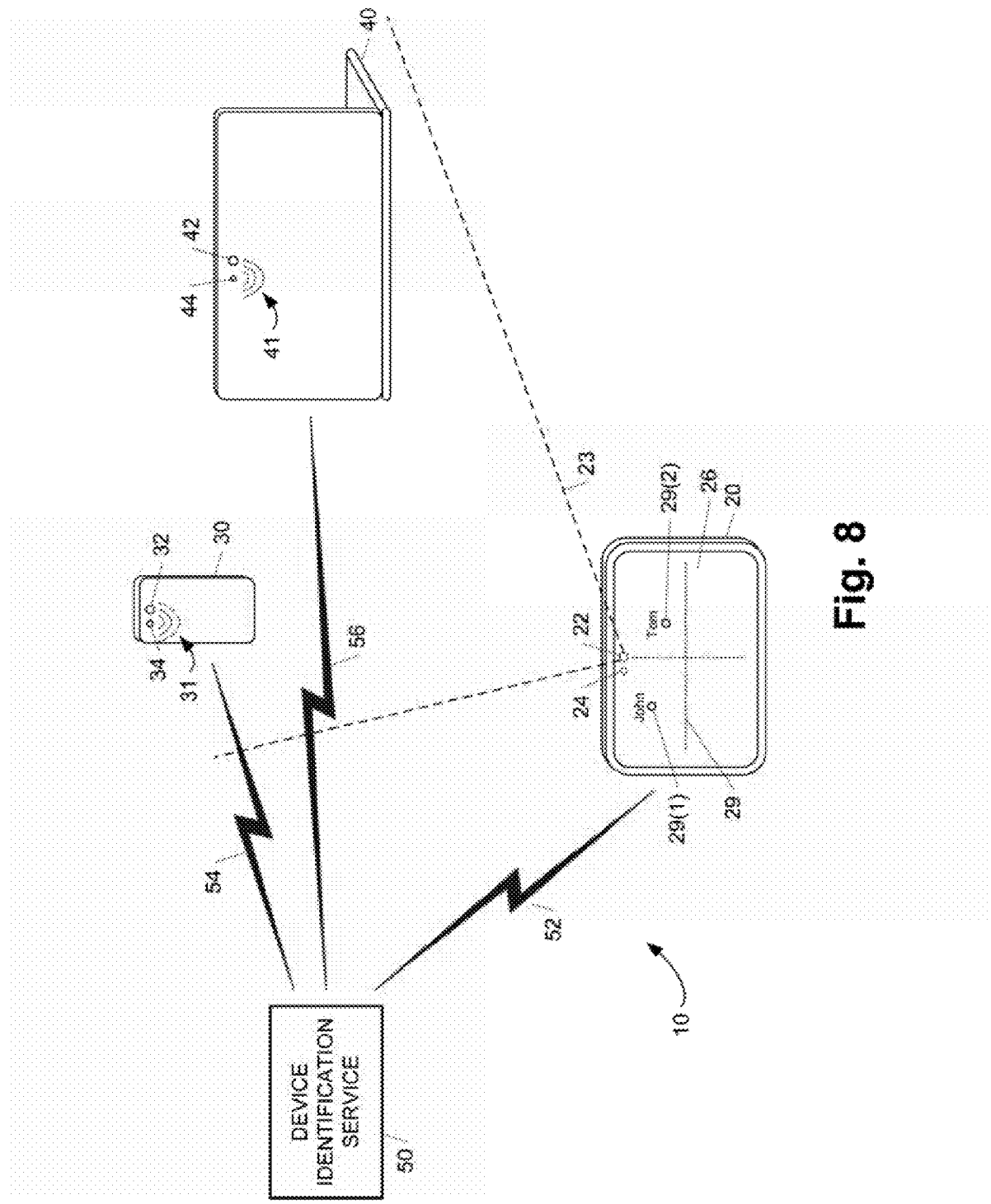
FIG. 8 is a schematic diagram illustrating an example of a processing system displaying a user interface to enable functionalities based on angles and distances between devices.

FIG. 8 is a schematic diagram illustrating an example of processing system 20 displaying a user interface to enable functionalities based on angles and distances between devices. In the example of FIG. 8, processing system 20 displays a regular map 29 with a representation for each device within field of view 23. Processing system 20 selects the location for each representation on circular map 28 in dependence upon a corresponding device angle (i.e., the angle between the device and an plane orthogonal to image plane of camera 22) and a corresponding device distance. Processing system 20 may estimate the distance between processing system 20 and devices from the average intensity of the emitted light signals or the amount of motion of the devices. Processing system 20 may also estimate the distance using triangulation for devices with two or more emitters or if equipped with two or more cameras 22.

In the illustrated example, regular map 29 includes a representation 29(1) of device 30 that includes information from device identification service 50 that identifies the user of device 30 as John and a representation 29(2) of device 40 that includes information from device identification service 50 that identifies the user of device 40 as Tom. The locations of representations 29(1) and 29(2) in regular map 29 are selected by processing system 20 in dependence on the device angles of devices 30 and 40, respectively, and the distances of devices 30 and 40, respectively, from processing system 20. Processing system 20 allows a user to select a target device by selecting any suitable portion of representation 29(1) or 29(2) to select device 30 or 40 (e.g., by dragging designated content on top of representation 29(1) or 29(2) using a touchscreen or mouse). In response to a target device being selected, processing system 20 invokes a functionality corresponding to the device (e.g., by sending designated content to the target device).

Figure 9:
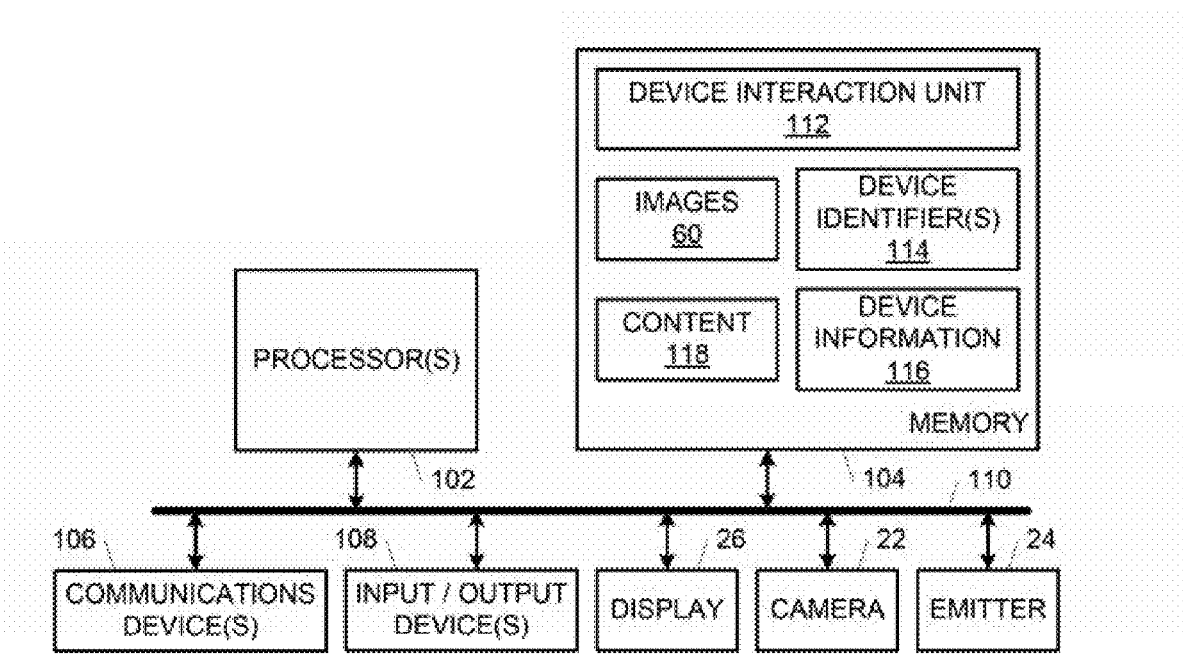
FIG. 9 is a block diagram illustrating an example of additional details of a processing system that implements a device interaction unit.

FIG. 9 is a block diagram illustrating an example of additional details of processing system 20 where processing system 20 implements a device interaction unit 112 to perform the functions described above. In addition to camera 22, emitter 24, and display 26, processing system 20 includes a set of one or more processors 102 configured to execute a set of instructions stored in a memory system 104, at least one communications device 106, and at least one input/output device 108. Processors 102, memory system 104, communications devices 106, and input/output devices 108 communicate using a set of interconnections 110 that includes any suitable type, number, and/or configuration of controllers, buses, interfaces, and/or other wired or wireless connections.

Each processor 102 is configured to access and execute instructions stored in memory system 104 and to access and store data in memory system 104.

Memory system 104 includes any suitable type, number, and configuration of volatile or non-volatile machine-readable storage media configured to store instructions and data. Examples of machine-readable storage media in memory system 104 include hard disk drives, random access memory (RAM), read only memory (ROM), flash memory drives and cards, and other suitable types of magnetic and/or optical disks. The machine-readable storage media are considered to be part of an article or article of manufacture. An article or article of manufacture refers to one or more manufactured components.

Memory system 104 stores images 60, device interaction unit 112, device identifiers 114, device information 113, and content 118 for sharing with other devices (e.g., devices 30 and 40). Device interaction unit 112 includes instructions that, when executed by processors 102, causes processors 102 to perform the functions described above with reference to FIGS. 1-18 including registering with device identification service 50 using communications devices 106, emitting light signal 21 (shown in FIG. 1) using emitter 24, capturing images 60 with camera 22, decoding device identifiers 114 from images 60, providing device identifiers 114 to device identification service 50 using communications devices 106, receiving device information 116 from device identification service 50 using communications devices 106, displaying images 60 and/or device information 116 on display 26, receiving a selection from a user using input/output devices 108, and providing content 118 to a target device.

Communications devices 106 include any suitable type, number, and/or configuration of communications devices configured to allow processing system 20 to communicate across one or more wired or wireless networks.

Input/output devices 108 include any suitable type, number, and/or configuration of input/output devices configured to allow a user to provide information to and receive information from processing system 20 (e.g., a touchscreen, a touchpad, a mouse, buttons, switches, and a keyboard).

Figure 10:
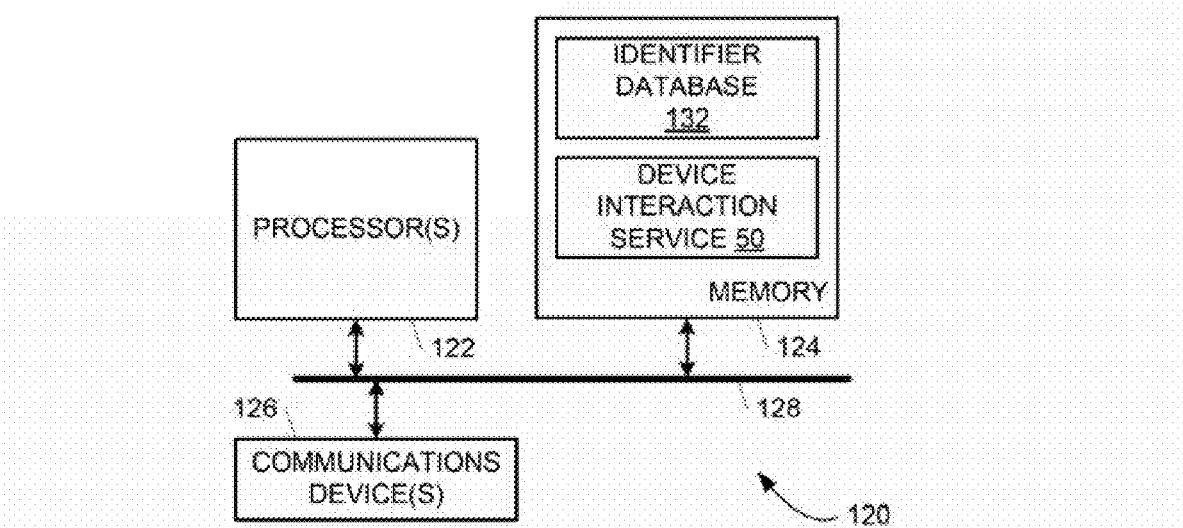
FIG. 10 is a block diagram illustrating an example of a processing system for implementing the device interaction service.

FIG. 10 is a block diagram illustrating an example of a processing system 120 for implementing device interaction service 50. Processing system 120 includes a set of one or more processors 122 configured to execute a set of instructions stored in a memory system 124, and at least one communications device 126. Processors 122, memory system 124, and communications devices 126 communicate using a set of interconnections 128 that includes any suitable type, number, and/or configuration of controllers, buses, interfaces, and/or other wired or wireless connections.

Each processor 122 is configured to access and execute instructions stored in memory system 124 and to access and store data in memory system 104.

Memory system 124 includes any suitable type, number, and configuration of volatile or non-volatile machine-readable storage media configured to store instructions and data. Examples of marine-readable storage media in memory system 124 include hard disk drives, random access memory (RAM), read only memory (ROM), flash memory drives and cards, and other suitable types of magnetic and/or optical disks. The machine-readable storage media are considered to be part of an article or article of manufacture. An article or article of manufacture refers to one or more manufactured components.

Memory system 104 stores device interaction service 50 and an identifier database 132. Device interaction service 50 includes instructions that, when executed by processors 122, causes processors 122 to perform the functions described above with reference to FIGS. 1-8 including registering processing system 20 and devices 30 and 40, generating device identifiers, storing and/or accessing device identifiers and other information concerning processing system 20 and devices 30 and 40 in identifier database 132, receiving device identifiers from processing system 20 and devices 30 and 40, providing device information corresponding to device identifiers from identifier database 132 to processing system 20 and devices 30 and 40, and facilitating interactions between processing system 20 and devices 30 and 40 (e.g., by providing designated content from processing system 20 to devices 30 and/or 40).

Communications devices 126 include any suitable type, number, and/or configuration of communications devices configured to allow processing system 120 to communicate across one or more wired or wireless networks.

What is claimed is:

1. A method performed by a processing device, the method comprising:
    capturing, by the processing device, a series of images with a camera of the processing system, wherein the series of images includes a first light signal emitted by a first device;
    determining, by the processing device, an identifier of the first device from the first light signal captured in the series of images;
    providing the identifier of the first device from the processing device to a device interaction service via a network connection;
    receiving information of the first device from the device interaction service;
    displaying, on a user interface of the processing device, an icon representing the first device based on the captured series of images and displaying the information of the first device received from the device interaction service;
    receiving a selection input indicating a selection of the first device, the selection input including a movement on the user interface from the icon representing the first device in a direction towards a location of the first device;
    determining, by the processing device, a selection angle between the direction of the selection input received on the user interface and a reference line on the user interface;
    determining, by the processing device, a first device angle between a line from a location of the processing device to the location of the first device and a reference plane;
    comparing the selection angle to the first device angle; and
    based on the comparison between the selection angle and the first device angle, determining that the first device has been selected to establish an interaction between the processing device and the first device.

2. The method of claim 1, wherein the information of the first device identifies a user of the first device.

3. The method of claim 2, further comprising:
    displaying a name of the user of the first device next to the icon of the first device on the user interface.

4. The method of claim 1, further comprising:
    sending designated content from the processing device to the first device.

5. The method of claim 1, wherein the reference plane is a plane orthogonal to the camera of the processing device.

6. The method of claim 1, further comprising:
    capturing, by the processing device, a second light signal emitted by a second device;
    determining a second device identifier of the second device from the captured second light signal;
    providing the second device identifier from the processing system to the device interaction service using the network connection; and
    receiving information of the second device from the device interaction service.

7. The method of claim 6, further comprising:
    displaying, on the user interface, an icon representing the second device and information of the second device;
    determining a second device angle between a line from the location of the processing device to the second device and the reference plane;
    comparing the selection angle and the second device angle; and
    determining that the first device has been selected in response to a determination that the first device angle is closer to the selection angle than the second device angle is to the selection angle.

8. An article comprising at least one non-transitory machine-readable storage medium storing instructions that, when executed by a processing system, cause the processing system to:
    capture a series of images with a camera of the processing system, wherein the series of images includes a first light signal emitted by a first device;
    determine an identifier of the first device from the first light signal captured in the series of images;
    provide the identifier of the first device to a device interaction service;
    receive information of the first device from the device interaction service;
    display, on a display of the processing system, a first representation of the first device based on the captured series of images and display the information of the first device received from the device interaction service;
    receive a selection input indicating a selection of the first device, the input including a movement on the display from the first representation of the first device on the display in a direction towards a location of the first device;
    determine a selection angle between the direction of the selection input received on the display and a reference line on the display;
    determine a first device angle between a line from a location of the processing system to the location of the first device and a reference plane;
    compare the selection angle to the first device angle; and
    determine that the first device has been selected based on the comparison between the selection angle and the first device angle.

9. The article of claim 8, wherein the instructions, when executed by the processing system, cause the processing system to:
    display the series of images including the first device on the display of the processing system.

10. The article of claim 8, wherein the instructions, when executed by the processing system, cause the processing system to:
    display the first representation of the first device at a first location on a circular map on the display based on the first device angle;
    display a second representation of a second device at a second location on the circular map based on a second device angle, wherein the first location of the first representation and the second location of the second representation on the circular map correspond to physical geographical locations of the first device and the second device, respectively, with respect to the processing system.

11. The article of claim 10, wherein the first location is further based upon a first distance between the first device and the camera of the processing system, and wherein the second location is further based upon a second distance between the second device and the camera of the processing system.

12. A method performed by a processing device, the method comprising:
- capturing, by a camera of the processing device, a series of images including a first light signal emitted by a first device and a second light signal emitted by a second device;
- determining an identifier of the first device from the first light signal captured in the series of images and a second light signal;
- obtaining, by the processing device, information of the first device based on the first device identifier and information of the second device based on the second device identifier;
- displaying, by the processing device, a first representation of the first device and a second representation of the second device on a user interface of the processing device;
- receiving a selection input on the user interface, the selection input including a movement on the user interface from the first representation of the first device in a direction towards a location of the first device;
- determining a selection angle between the direction of the selection input and a reference line on the user interface;
- determining, by the processing device, a first device angle between a line from a location of the processing device to the location of the first device and a reference plane;
- comparing the selection angle and the first device angle; and
- determining that the first device has been selected based on the comparison between the selection angle and the first device angle.

13. The method of claim 12, further comprising:
providing, from the processing device to a device interaction service, designated content and the first device identifier to cause the designated content to be provided to the first device by the device interaction service.

14. The method of claim 12, further comprising:
determining a second device angle between a line from the processing device to the second device and a reference plane;
comparing the selection angle and the second device angle; and
determining that the first device has been selected in response to a determination that the first device angle is closer to the selection angle than the second device angle is to the selection angle.

15. The method of claim 12, wherein displaying the first representation of the first device and the second representation of the second device comprises:
displaying, on the user interface, the first representation of the first device at a first location on a circular map;
displaying the second representation of the second device at a second location on the circular map, wherein the first location of the first representation and the second location of the second representation on the circular map correspond to physical geographical locations of the first device and the second device, respectively, with respect to the processing system.

* * * * *